United States Patent
Seltzer et al.

(10) Patent No.: US 8,276,544 B2
(45) Date of Patent: Oct. 2, 2012

(54) SOUND DAMPENED PET ABODE

(76) Inventors: Robyn Seltzer, Weston, FL (US); Steven Seltzer, Weston, FL (US)

( * ) Notice: Subject to any disclaimer, the term of this patent is extended or adjusted under 35 U.S.C. 154(b) by 122 days.

(21) Appl. No.: 12/628,596

(22) Filed: Dec. 1, 2009

(65) Prior Publication Data
US 2011/0126775 A1 Jun. 2, 2011

(51) Int. Cl.
*A01K 1/03* (2006.01)
(52) U.S. Cl. .................. 119/501; 119/496; 340/573.3
(58) Field of Classification Search .......... 119/196–501, 119/163, 77.2, 77.3, 77.4; 340/573.1, 573.3
See application file for complete search history.

(56) References Cited

U.S. PATENT DOCUMENTS

| | | | |
|---|---|---|---|
| 3,857,459 A | 12/1974 | Adams et al. | |
| 3,861,356 A | 1/1975 | Kulka | |
| 3,934,552 A | 1/1976 | Kulka | |
| 3,942,306 A | 3/1976 | Kulka | |
| 4,084,366 A | 4/1978 | Saylor et al. | |
| 4,244,439 A | 1/1981 | Wested | |
| 4,477,505 A | 10/1984 | Warnaka | |
| 4,696,260 A | 9/1987 | Panessidi | |
| 4,962,729 A | 10/1990 | Barreto et al. | |
| 5,088,445 A | 2/1992 | Brindamour | |
| 5,220,886 A | 6/1993 | Hyde | |
| 5,317,113 A | 5/1994 | Duda | |
| 5,594,218 A * | 1/1997 | Diaz et al. ................. 181/295 | |
| 5,615,640 A | 4/1997 | Luiz | |
| 5,623,892 A | 4/1997 | O'Rourke et al. | |
| 5,782,206 A | 7/1998 | Markowitz | |
| 5,791,288 A | 8/1998 | Ehrler | |
| 5,964,190 A | 10/1999 | Willinger et al. | |
| 6,237,534 B1 | 5/2001 | Schwartz | |
| 6,269,775 B1 | 8/2001 | Watts | |
| 6,312,507 B1 | 11/2001 | Taylor et al. | |
| 6,318,296 B1 * | 11/2001 | Nguyen ................. 119/502 |
| 6,382,351 B1 | 5/2002 | Lastowski | |
| 6,439,165 B1 | 8/2002 | Guard | |
| 6,490,995 B2 * | 12/2002 | Greene, Jr. .............. 119/496 |
| 6,675,740 B1 | 1/2004 | Payne | |
| 6,681,524 B1 | 1/2004 | Tillson | |
| 6,710,714 B2 * | 3/2004 | Conway ................ 340/573.3 |
| 6,981,347 B1 | 1/2006 | Walburger | |
| 7,134,404 B2 | 11/2006 | Slone | |
| 7,322,314 B1 | 1/2008 | Sweeney | |
| 8,132,537 B2 * | 3/2012 | Trunnell et al. ........... 119/496 |
| 2003/0168017 A1 | 9/2003 | Perelli et al. | |
| 2005/0268859 A1 | 12/2005 | Bello | |
| 2005/0284405 A1 * | 12/2005 | Pomakoy-Poole et al. ... 119/497 |
| 2006/0102084 A1 | 5/2006 | Garfield | |

* cited by examiner

*Primary Examiner* — Timothy D Collins
*Assistant Examiner* — Brian M O'Hara
(74) *Attorney, Agent, or Firm* — Patents on Demand P.A.; Brian K. Buchheit; Scott M. Garrett

(57) ABSTRACT

A pet abode with sound dampening characteristics comprising an interior space of a pet abode having sufficient dimensions to allow a pet to comfortably reside within the interior space. The interior space is formed from at least three walls where one or more of the walls exhibits sound dampening characteristics. The sound dampening characteristics reduces a one or more sounds originating from a source external to the interior space. That is, the interior space of the pet abode is sound proofed (or sound dampened), allowing a pet to be undisturbed by loud noises outside the interior space.

19 Claims, 5 Drawing Sheets

SOUND DAMPENED PET ABODE

BACKGROUND

The present invention relates to the field of pet enclosures and, more particularly, to sound dampened pet abode.

In many instances, pets can become petrified in environments having loud noises. This is a concern for many pet owners as they seek to provide absolute care and comfort for their pet during their pet's lifetime. Common situations where environmental noises can be particularly disturbing to pets are harsh weather conditions. Conditions such as thunderstorms, hail precipitation, and hurricanes can disturb and alarm pets. For instance, storms can cause loud noises such as thunder, rattling window panes, slamming doors, all of which can frighten pets and cause unwanted discomfort for the pet as well as the pet owner.

Often times, pet owners transport their pets in pet carriers which provide an easy and reliable means to carry their pet. Unfortunately, during transport, pets can be subject to many disrupting environmental noises. Noises such as traffic noise, vehicle noise and, other proximate pet noises can prove distressing to the pet. Traditional pet carriers frequently provide little comfort for the pet in way of protecting them from these external noises. One reason for this is that tradition pet carriers often have an open construction (e.g., mesh doors/sides).

This situation can be exasperated when pets are traveling/away from home. Often pet carriers do not provide ample protection against external noises. For instance, when traveling abroad, a busy airport terminal can be extremely disorienting to pets. While a few pet carriers, which are commercially available address this issue, they have numerous significant shortcomings.

A common problem with pet carriers which have sound dampening characteristics is that the sound dampening can inhibit pet monitoring. That is, a pet making noises to express discomfort can not be heard due to the sound dampened carrier absorbing the pet's noise. In these instances, pet owners, unable to hear their pet, must physically view the pet, a task which can sometimes be infeasible. This situation is worsened as existing pet carriers that dampen noise can have heat retention issues. That is, not only do you fail to hear a pet, that pet can be distressed and even harmed by abnormal environmental conditions of an interior of a pet carrier. What is needed is solution which can address these shortcomings and provide the pet owner and the pet with ample comfort.

BRIEF SUMMARY

The disclosure presents a solution for a pet abode with sound dampening characteristics. The pet abode permits a pet to have a safe place to retreat when environmental situations make the pet uncomfortable. In one embodiment, the pet abode can include walls with sound dampening characteristics permitting sound dampening to occur unidirectionally (e.g., external to internal dampening). The pet abode can include one or more combination of features including, but not limited to, active/passive sound dampening, active/passive ventilation, a bed, feeding/watering containers, audio/video inputs and/or outputs, biometric sensors for monitoring physiological states of a pet, and the like. In one embodiment, the pet abode can be a stationary/in-house living facility. In another embodiment, the pet abode can be a portable carrier allowing pets to be transported in a traditional manner.

In one embodiment of the disclosure, a pet abode with sound dampening characteristics can include an interior space having sufficient dimensions to allow a pet to comfortably reside within the interior space. The interior space can be formed from at least three walls, wherein at least one of the walls exhibits sound dampening characteristics, wherein the sound dampening characteristics mitigates sounds transmitted to the interior space, where the sounds originates from a source external to the interior space. Sound dampening properties can reduce a sound pressure level of sounds heard within the interior space by at least half of the sound pressure level detected at an exterior point of the pet abode.

In one embodiment of the disclosure, a pet abode can include a material established boundary, a door, and an air cooling system. The material established boundary can form a fully enclosed volume. The volume can include an interior space for pets to reside within. The boundary can be formed from sound dampening materials, which are thermal insulators. The door can be a sealable door embedded in the material established boundary. The door can open and close. Pets are able to be inserted and removed from the pet abode via the door. The air cooling system can have an exterior intake and outtake opening within the material established boundary. The air cooling system can include at least one fan. The fan can be used to selectively cool an interior of the pet abode. A sound pressure level of sounds heard within the interior space of the pet abode can be reduced by at least half of the sound pressure level detected at an exterior point of the pet abode.

In one embodiment of the disclosure, a pet abode can house a pet. The pet abode can have sides formed from a sound dampening material such that a sound pressure level of sounds heard within the interior space of the pet abode are reduced by at least half of the sound pressure level detected at an exterior point of the pet abode. The pet abode can include a sealable door embedded in a side of the pet abode, which is able to be opened and closed. The abode can also include a climate control system comprising at least one climate sensor, at least one user adjustable climate control, and at least one heating/cooling element. The climate control system can maintain the interior space of the pet abode within a temperature range established by the user adjustable climate control and sensed by the climate sensor. The pet abode can also include at least one window through which a pet included in the interior space is able to be viewed.

DETAILED DESCRIPTION

As will be appreciated by one skilled in the art, the present invention may be embodied as a system and/or method.

Accordingly, the present invention may take the form of an entirely hardware embodiment or an embodiment combining software and hardware aspects that may all generally be referred to herein as a "circuit," "module" or "system."

Figure 1:
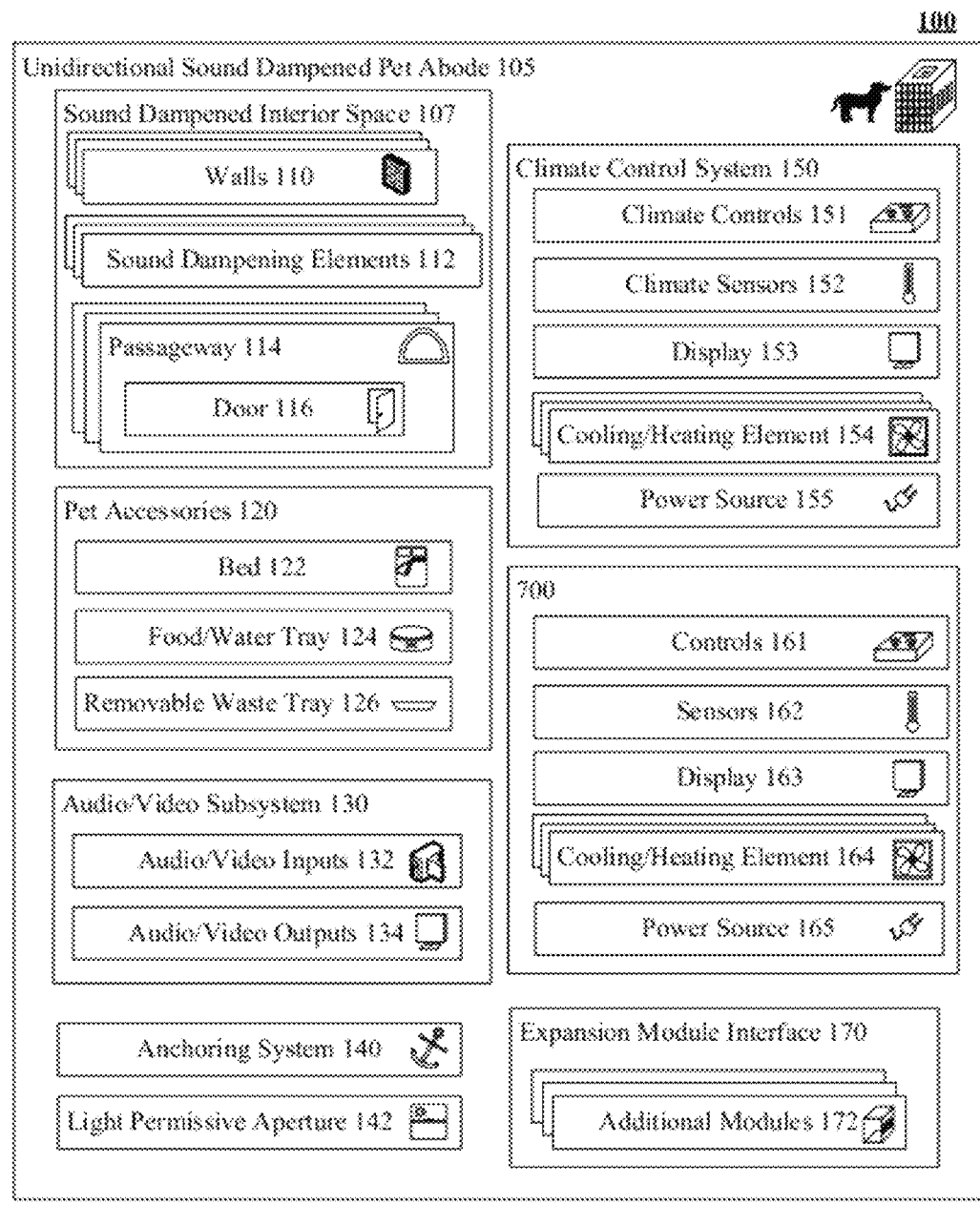
FIG. 1 is a block diagram illustrating a system for a sound dampened pet abode in accordance with an embodiment of the inventive arrangements disclosed herein.

FIG. 1 is a block diagram illustrating a system 100 for a sound dampened pet abode in accordance with an embodiment of the inventive arrangements disclosed herein. In system 100, a unidirectional sound dampened pet abode 105 can provide a safe haven for a pet when environmental conditions (e.g., noise) become unfavorable for the pet. In system 100, the unidirectional sound dampened pet abode 105 can include elements 110-172, but is not limited to, the disclosed arrangement of system 100. The unidirectional nature of sound dampening is for one contemplated embodiment of the invention, where incoming sound is dampened more significantly than outside sound. This can permit a pet owner can hear sounds of the inside of a pet abode 105, while minimizing sounds heard by a pet inside the abode 105. Other embodiments exist, and pet abodes having uniform sound dampening characteristics are to be considered within scope of the disclosure.

Pet abode 105 can be constructed to fit the needs of various types of pets. In one embodiment, abode 105 can be manufactured having traditional/common dimensions. For instance, pet abode 105 can be customized for a range of dogs from small dogs to large dogs. In another instance, pet abode 105 can have dimensions suitable for birds (e.g., tall and/or wide). In another embodiment, abode 105 can facilitate special needs pets including physically disabled pets, pets suffering from chronic and/or terminal illness, injured pets, elderly pets, behaviorally challenged pets, and the like.

As used herein, sound dampening elements 112 can be one or more components configured to reduce vibrational energy originating from a source external to the sound dampened interior space 107. That is, sound from the outside of the pet abode 105 is absorbed minimizing interior space 107 noise. The sound dampening elements 112 can also dampen sounds originating from the interior space 107 of the pet abode. The interior space 107 can refer to a volume of space which a pet can comfortably occupy for a duration of time. Interior space 107 can include, but is not limited to, walls 110, sound dampening elements 112, passageway 114, and door 116. In one embodiment, sound dampening elements 112 can be integrated into wall 110.

As used herein, sound dampening elements 112 can include, but are not limited to polyurethane, sound dampening foams, acoustic foam, and the like. In one embodiment sound dampening elements 112 can include traditional and non-traditional structurally dampening arrangements. For instance, air chambers (e.g., honeycomb designs) can be integrated within walls 110. In alternative embodiments, sound dampening can be achieved using double walled embodiments. In one embodiment, elements 112 can be selectively removable. In one embodiment, sound dampening elements 112 can be supplemented with white noise generators (not shown) which generate sound for the interior space 107 that is comforting to a pet, which helps mask external sounds, which may be distressing to the pet.

In one instance, sound dampening elements 112 can include vibrational dampening materials. That is, elements 112 can aid with reducing environmental vibrations which can agitate pets. Environmental vibration can include sources such as transportation (e.g., traveling in a car), tremors, noises having substantial vibrational energy, weather, and the like. For instance, elements 112 can be used to absorb vibrational energy resulting from road noise.

Walls 110 can conform to traditional pet carrier materials including, but not limited to, plastic, wood, metal, fabric, composite materials, and the like. One or more walls 110 can include passageway 114 which can act as an entry/exit point for a pet. Passageway 114 can include door 116 which can have sound dampened characteristics. For instance, door 116 can create a soundproof (or sound minimizing) seal when closed, allowing abode to remain sound dampened while having multiple entry/exit points.

Sound dampened pet abode can include one or more pet accessories 120 useful in maintaining pet comfort level while residing in the pet abode. Pet accessories 120 can include, but is not limited to, bed 122, food/water tray 124, and removable waste tray 126. One or more accessories 120 can be optional based on pet abode shape, dimensions, and the like. In one instance, accessories 120 can be permanently installed (e.g., manufacturer fastened). In another instance, accessories 120 can include commercial off-the-shelf and/or after market accessories which can be selectively removable.

Audio/video subsystem 130 can be employed to monitor and maintain pet comfort levels. Subsystem 130 can include audio/video inputs 132 and/or audio/video output 134. Subsystem components 132, 134 can be located inside and/or outside pet abode 105. In one embodiment, components 132, 134 can be remotely located permitting aural/visual monitoring of a pet. For instance, a pet owner unable to physically view their pet can utilize an audio/video output feed from component 134 to remotely monitor the pet. In another embodiment, when interior space 107 is significantly dampened to make pet generated sounds difficult to hear, an interior microphone and exterior speaker arrangement can be include in the abode 105, which effectively turns the sound dampening characteristics of the abode 105 into a unidirectional dampening regardless of the sound absorption properties of the walls 110 and elements 112. In one embodiment, interior sounds can even be magnified (i.e., can have adjustable volume controls) and/or transmitted to a remove audio transducer (e.g., an earpiece worn by an owner, for example) to ensure that pet owners are able to hear any sounds of distress produced by their pet while in the abode 115.

Anchoring system 140 can permit pet abode to be securely fastened to a physical object/location. Anchoring system 140 can include but is not limited to, nuts and bolts, ratcheting clamps, cam locks, cable ties, and the like. In one embodiment, system 140 can be compatible with safety belts common in traditional transport vehicles. For example, car seat belts can be used to securely fasten the pet abode 105 to a car seat. In another embodiment, system 140 can be compatible with bicycles and/or motorcycles, permitting the pet abode 105 to be securely fastened. Anchoring system 140 can also be used as a security device (e.g., lock) for portable pet carriers to ensure the pet abode 105 remains stationary (e.g., is not stolen) during travel. For example, the anchoring system 115 can be used to affix the abode 105 to permanent objects of an airport, when a traveler with a pet is forced to use a restroom or to otherwise leave a proximate region of the abode 105 for a brief time.

Light permissive aperture 142 can be an opening in a wall 110 allowing a light source from an exterior region to be transmitted into the interior space 107. Light permissive aperture 142 can include windows, air holes, walls constructed from transparent materials, and the like. In one embodiment, light permissive aperture 142 can include one or more skylights permitting natural light to illuminate a portion of the abode 107 interior. In one embodiment, the aperture 142 can be replaced with and/or supplemented by a light emitting source, such as a LED light. Further, a user selectable option can selectively open/close the aperture 142 and/or brighten or dim interior space 107 lighting to a user selected level.

Climate control system 150 can include one or more components utilized for maintaining suitable living conditions for the interior space 107 of the pet abode 105. System 105 can include, but is not limited to, climate controls 151, climate sensors 152, display 153, cooling/heating element 154, and power source 155. In one embodiment, sound dampened interior space 107 can be a hermetically sealed (or partially sealed in another embodiment) enclosure, system 150 can provide necessary air conditioning to ensure pet survival and comfort.

Climate controls 151 can include user interface elements permitting customized control of system 150. Controls 151 can permit configuration of environmental conditions of interior space 107 including, but not limited to, temperature, humidity, allergen filtering, and the like. For instance, system 150 can be configured specifically for reptiles which require precise humidity conditions. Controls 151 can be linked to display 153 which can provide visual/aural feedback for system 150 configurations and/or status. Controls 151 can include tactile buttons, dials, touch screen displays, and the like. Climate controls 151 can be particularly beneficial for situations (such as airplane travel) where a pet is placed in environmental conditions (e.g., a rear portion of a plane) which a pet owner has little control over.

Climate sensors 152 can be utilized to provide continuous feedback to system 150 permitting interior space 107 to be constantly climate controlled. Sensors 152 placed internally and/or externally can obtain environmental condition information useful in permitting climate regulation to occur. Sensors 152 can include, but are not limited to, thermometer, hygrometer, barometer, and the like.

In one embodiment, sensors 152 can be located on the exterior of the pet abode 105 to monitor exterior conditions useful in adjust interior climate as necessary. In many instances, sound dampening can also insulates interior space 105. In these instances, sensors 152 can be located within the sound dampened interior space 107 to monitor conditions and adjust interior space 107 climate appropriately.

Display 153 can be coupled to system 150 to provide aural/visual feedback to a pet owner of the sound dampened interior space 107. Display 153 can include, but is not limited to, liquid crystal display (LCD), light emitting diode (LED), and the like. In one embodiment, display 153 can provide real-time feedback of the sound dampened interior space 107. In one embodiment, the display 105 and other output generators can be wirelessly coupled to an external device. For example, the pet abode 105 can include a wireless transmitter (e.g., WIFI, BLUETOOTH, etc.) that conveys radio frequency signals to a remote device, such as a mobile phone. The remote device can include a user interface that presents abode 105 information and/or that permits a user to adjust client controls 151, interior lighting, and the like of the abode using the remote device.

Cooling/heating element 154 can be used to moderate the temperature of interior space 107 accordingly. Element 154 can include, but is not limited to, fans, vents, heating elements, heat extracting components, and the like. Abode 105 can include multiple cooling/heating elements 154 necessary for creating a uniform climate within the abode 105.

Power source 155 can include one or more components capable of providing electrical power for system 150. In one embodiment, power source 155 can be an electro-chemical battery. In another embodiment, source 155 can be a standard alternating current (AC) power outlet. Power source 155 can include any electrical source capable of providing suitable power for pet abode 105.

In one embodiment, sound dampened pet abode can utilize commercial off-the-shelf batteries, proprietary batteries, and the like. Batteries can include rechargeable and non-rechargeable technologies. Rechargeable batteries can utilize one or more technologies including, but not limited to, nickel-cadmium, lithium ion, and the like.

Fail-safe climate control system 160 can be a backup climate control system which can automatically activate on failure of system 150. For instance, in the event of system 150 failure, system 160 can be configured to alert the pet owner. In one configuration of the instance, system 160 can provide an aural alarm to audibly alert the pet owner of system 150 failure. In another instance, system 160 can provide one or more electronic alerts including, but not limited to, e-mail, short message service (SMS) alerts, voice call alerts, and the like.

In one embodiment, the fail-safe system 160 can automatically open the door 116 (especially in a stationary embodiment, where the abode is not being used for travel) to permit a pet to enter/leave the abode 105 should an interior temperature become uncomfortable to the pet. Additional internal actuators can optionally be used to encourage a pet to leave the abode 105 during climate failure conditions, where a pet can be harmed. For example, an interior speaker (such as used to normally generate white noise) can produce discomforting sounds designed to encourage the pet to exit the abode 105.

In one embodiment, climate control system 160 can be identical in configuration to system 150. In an alternative embodiment, system 160 can be comprised of a combination of one or more elements 161-165. Fail-safe climate control system 160 can be an optional component which can be suitable for luxury version of pet abode, where more economically priced versions can lack system 160.

Expansion module interface 170 can be a modular interface for permitting additional pet abode modules to be securely affixed to the pet abode. In one embodiment, multiple pet abodes 105 can be modularly connected together to create a "run". For instance, two or more pet abodes can be joined together to create a shared play environment for pets. In one embodiment, interface 170 can include sound dampening materials. That is, the integrity of the sound dampened abode is not compromised when an additional module 172 is attached. Expansion modules can be very useful for ensuring a suitable size is maintained for the abode 105 as a pet grows, while not requiring an owner to purchase a new abode 105. Use of expansion interface 170 and modules 172 can also be very useful to create a relatively small travel configuration (that lacks modules 172) of the abode 105 while permitting the abode 105 to be expanded upon reaching a travel destination.

Additional module 172 can be an optional module which can be selectively connected to pet abode 105. In one instance, module 172 can be an after market component compatible with interface 170. Modules 172 can include interior spaces containing additional pet accessories, supplemental sound dampened interior space, and the like.

Further, in one embodiment, the entire design of the abode 105 can be modular in nature, which permits different components to be selectively coupled/decoupled. This can reduce an initial cost of the abode 105 (e.g., permit a pet owner to purchase an economy version) while allowing additional comforts to be selected in a post-purchase phase. A modularly designed abode 105 can also permit a user to select a configuration that suits a particular need. For example, a travel version of an abode 105 can be a streamlined one that lacks many of the modules, which are present for the abode 105 when constructed in an owner's dwelling.

Drawings disclosed herein are for illustrative purposes only and should not be construed to limit the invention in any regard. Elements 120, 130, 140, 142, 150, 160, 170 can be optional in various embodiments depending on a variety of parameters. Parameters can include, but are not limited to, pet requirements, pricing schemes, portability, and the like. In one embodiment, a luxury version of pet abode 105 can include audio/video subsystem 130 which can be absent in various economically priced versions of pet abodes 105.

Figure 2A:
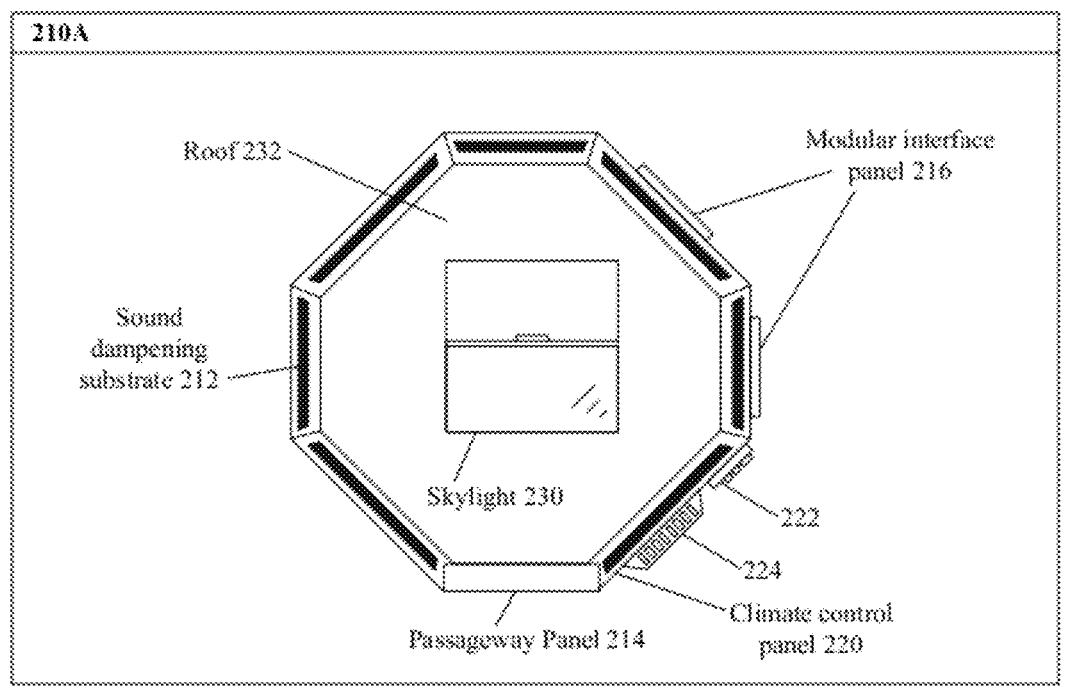
FIG. 2A is a schematic diagram illustrating a set of views for a unidirectional sound dampened pet enclosure in accordance with an embodiment of the inventive arrangements disclosed herein.
Figure 2A:
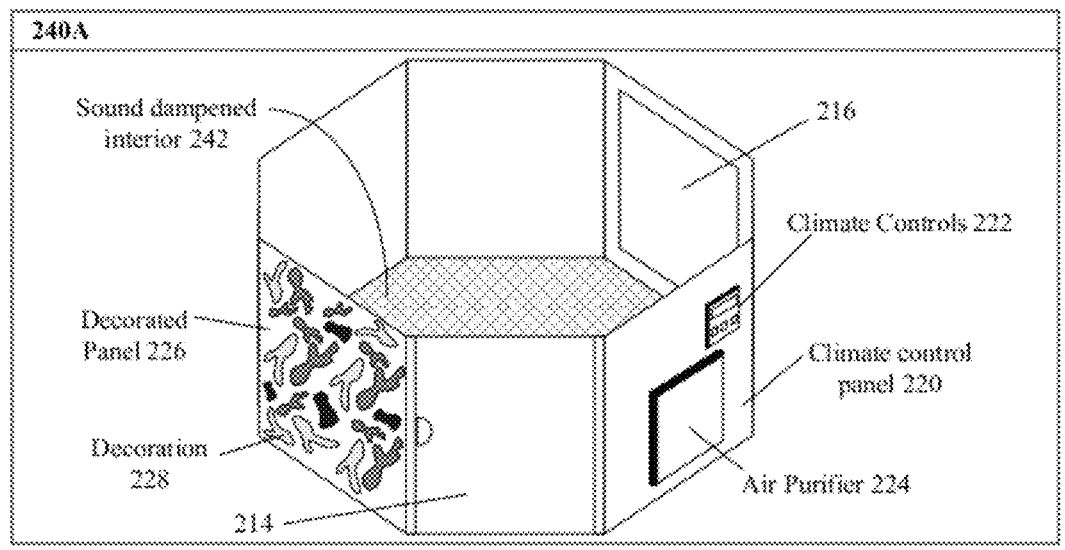

FIG. 2A is a schematic diagram illustrating a set of views 210A, 240A for a unidirectional sound dampened pet enclosure in accordance with an embodiment of the inventive arrangements disclosed herein. The embodiment is illustrated using two different views 210A, 240A demonstrating the characteristics of a sound dampened pet enclosure 200A. View 210A illustrates a top down perspective of embodiment 200A. View 240A illustrates an isometric perspective of embodiment 200A. In view 240A, for purposes of simplicity, a sound dampened pet abode can be illustrated lacking a roof. The roof 232 of the sound dampened pet abode can also have sound dampening characteristics.

In the pet enclosure 200A, a sound dampened pet abode can be an indoor pet enclosure (e.g., pet home inside a pet owner's house) allowing a pet to safely retreat from sounds which discomfort the pet. The indoor pet enclosure 200A can comprise of extensible modular sound dampened panels 214-226. Panels 214-226 can be rigid structures which can be modularly connected together.

Enclosure 200A can include panels 214-226 having embedded sound dampening substrate 212. In one embodiment, substrate 212 can be permanently embedded into panels 214-226 (e.g., manufacturer installed). In another embodiment, sound dampening substrate 212 can be selectively removable (e.g., insertable element), allowing pet owners to customize the sound dampening of the enclosure 200A.

In one embodiment, panels 214-226 can be manufactured in a variety of shapes, sizes, thickness, and the like. Panels 214-226 can include passageway panels 214, modular interface panels 216, climate control panels 220, decorated panels 226, flooring panels (not shown), roof panels 232, and the like. In the embodiment, panels 214-226 can be modularly connected enabling pet owners to create a highly customized sound dampened pet abode. Connection mechanisms can include, but is not limited to, self-securing mechanisms, fastener dependent mechanisms, and the like. For instance, panels 214-226 can be connected using a sliding dovetail joint.

In one configuration of the embodiment, panels 214-226 can be arranged into a configuration permitting the use of roof panel 232. In the configuration roof panel 232 can include skylight 230 which can provide natural light to illuminate the sound dampened interior 242. For instance, enclosure 200A can be placed near windows where sunlight/moonlight can enter through skylight 230 creating a more natural environment for a pet inhabiting the enclosure.

Passageway panel 214 can include one or more openings permitting a pet to move from the interior of the enclosure 200A to the exterior and vice versa. Openings can include, but are not limited to, doors, flaps, and the like. For instance, panel 214 can have a door with a latch which can be securely closed allowing the enclosure to be used as a pen.

Climate control panel 220 can be used to provide self-regulating climate control for pet enclosure 200A. Climate control panel 220 can utilize one or more climate control components. Components can include, but are not limited to, climate controls 222, air purifier 224, fans, vents, and the like. Sound baffles can be optionally included at air ingress, egress points to minimize sounds generated from climate control elements.

In one instance, panels 214-220 can include decoration 226 which can be manufacturer specified. In the instance, decoration accessories can be provided to permit pet owners to further customize decorative panel 226. For example, pet owners can custom order decorated panels to match the interior decor of the pet owner's house.

Drawings used herein are for illustrative purposes only and should not be construed to limit the invention in any regard. Embodiment 200A can include, but are not limited to, elements 212-226. It should be appreciated that embodiment 200A can vary from an implemented commercial product. In one instance, pet enclosure 200A can be physically fixed to a location. In another instance, pet enclosure 200A can be constructed from lightweight materials allowing a pet owner to easily relocate the pet enclosure 200A.

In one embodiment, the indoor pet enclosure 200A can be anchored through the use of one or more anchoring elements. In the embodiment, anchors can be integrated into exterior wall 230. For instance, anchors can be weighted elements at the base of exterior wall 230. In another embodiment, pet enclosure 200A can lack anchoring elements.

Figure 2B:
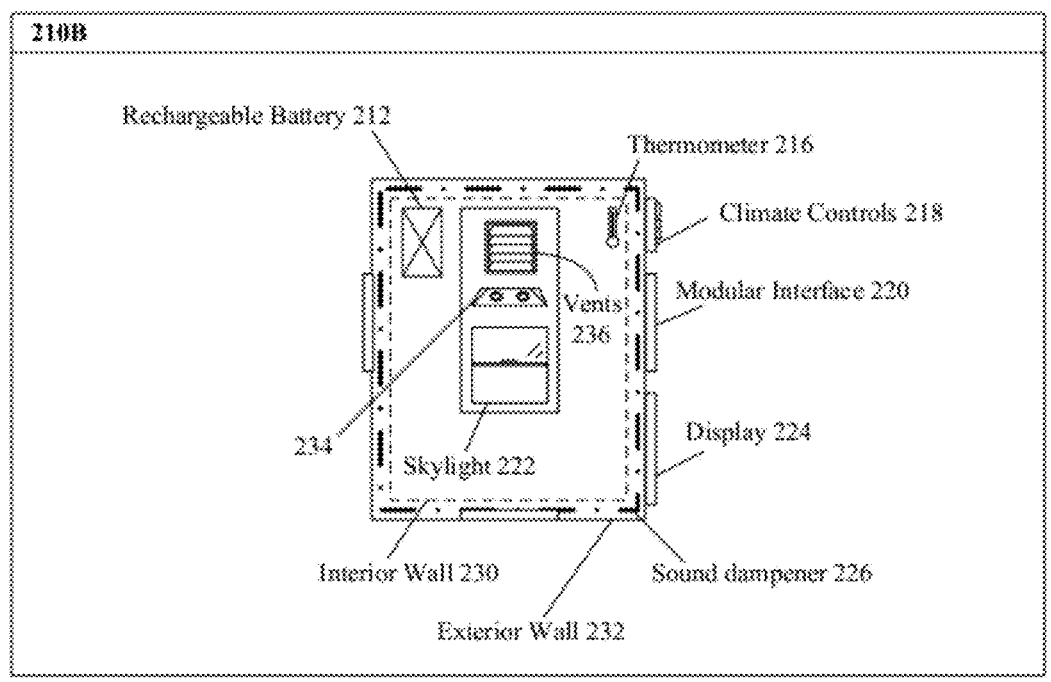
FIG. 2B is a schematic diagram illustrating a set of views for an embodiment of a unidirectional sound dampened pet abode in accordance with an embodiment of the inventive arrangements disclosed herein.
Figure 2B:
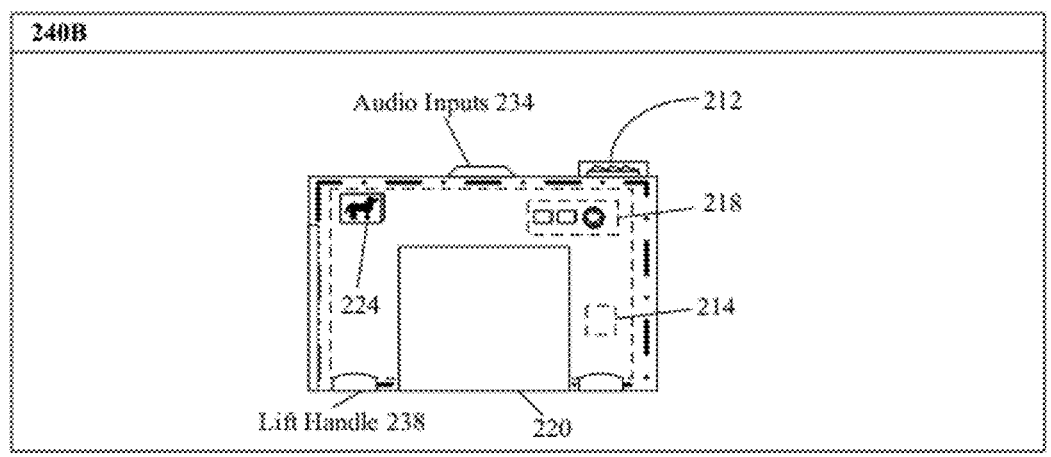

FIG. 2B is a schematic diagram illustrating a set of views 210B, 240B for an embodiment of a unidirectional sound dampened pet abode 200B in accordance with an embodiment of the inventive arrangements disclosed herein. The embodiment is illustrated using two different views 210B, 240B presenting a sound dampener 226 sandwiched between an internal wall 230 and an exterior wall 232. View 210B illustrates a top down perspective of embodiment 200B. View 240B illustrates a side perspective of embodiment 200B.

In the embodiment, a sound dampened pet abode can conform to traditional pet carrier designs (e.g., shape, appearance, weight). In the embodiment, the pet abode can include one or more elements 212-238. Elements can include, but are not limited to, rechargeable battery 212, speakers 214 thermometer 216, climate controls 218, modular interface 220, skylight 222, display 224, audio inputs 234, vents 236, lift handles 238, and the like.

In the embodiment, the sound dampened pet abode can have active cooling/heating capabilities. The pet abode can be actively cooled/heated utilizing rechargeable battery 212 as a power source. In one configuration, pet abode 200A can include vents 236 which can modulate the air flow in the pet abode based on temperature information obtained from vents 236.

Lift handles 238 can permit easy transportation of the unidirectional sound dampened pet abode 200A. Lift handles 238 can include cut outs, finger holes for gripping, handles, and the like.

Audio inputs 234 can provide pet owners with capabilities to pipe audio into the pet abode 200A. Inputs 234 can include common audio input connectors, including, but not limited to, tip ring sleeve (TRS) connector (e.g., 3.5 mm stereo jack), phono plug, and the like. For instance, speakers 214 located inside the pet abode can output audio from sources such as MP3 players.

Figure 3A:
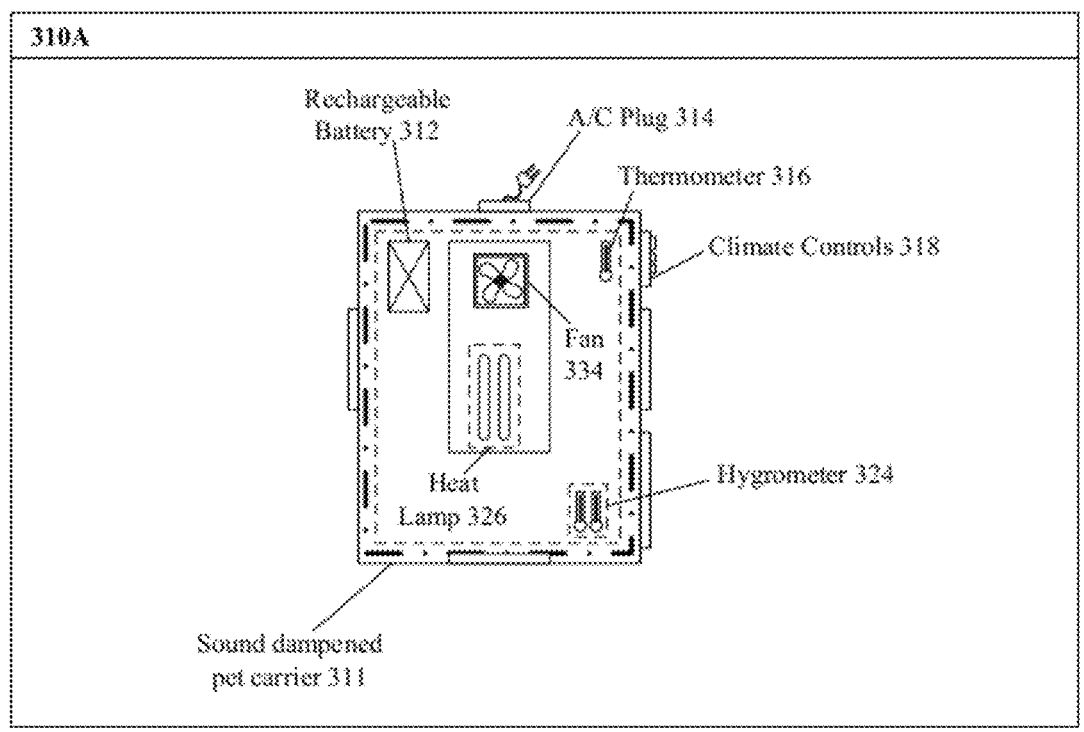
FIG. 3A is a schematic diagram illustrating a view for a unidirectional sound dampened pet carrier in accordance with an embodiment of the inventive arrangements disclosed herein.

FIG. 3A is a schematic diagram illustrating a view 310A for a sound dampened pet carrier 311 in accordance with an embodiment of the inventive arrangements disclosed herein. In 310A, a sound dampened pet abode can conform to traditional pet carrier designs (e.g., shape, appearance). In the embodiment, the pet carrier 311 can include one or more elements 312-326. Elements 312-326 can include, but are not limited to, rechargeable battery 312, alternating current (A/C) plug 314, thermometer 316, climate controls 318, hygrometer 324, heat lamp 326, fan 334, and the like.

In the embodiment, the pet carrier 311 can include multiple power sources for improved abode portability and pet comfort. For instance, A/C plug 314 can be used to recharge rechargeable battery 312 when the battery 312 requires charging.

Climate controls 318 can be utilized to moderate the interior climate of the pet carrier 311. Using temperature data and humidity information (from hygrometer 324), climate controls can automatically regulate temperature and humidity of pet carrier 311 interior. For example, fan 334 can automatically turn on when the interior of the pet carrier 311 becomes too hot. Conversely, heat lamp 326 can be toggled on/off when the pet carrier 311 interior requires regulation. For example, climate controls 318 can be used to temporarily replicate a terrarium environment.

In one embodiment, pet carrier 311 can include an electric dehumidifier for pets which require specific environmental humidity levels. For instance, hygrometer 324 can provide humidity feedback of pet carrier 311 interior which can be used by climate controls 318 to regulate environmental humidity levels.

The embodiment 300A is not limited to the configuration disclosed herein as other arrangements are contemplated. Embodiment 300A can include any combination of elements 312-334.

Figure 3B:
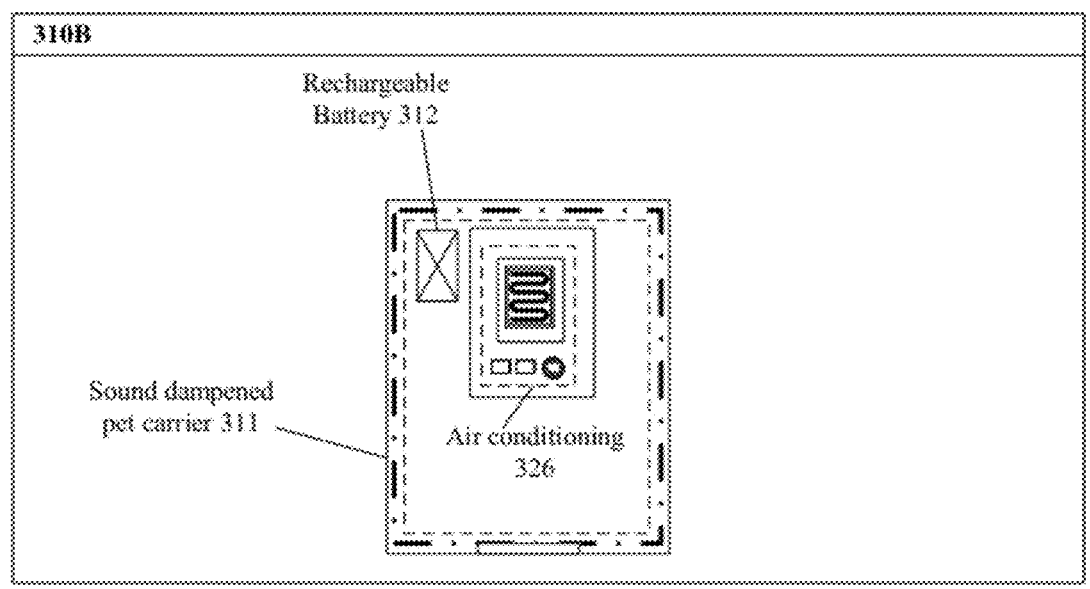
FIG. 3B is a schematic diagram illustrating a view for a unidirectional sound dampened pet carrier in accordance with an embodiment of the inventive arrangements disclosed herein.

FIG. 3B is a schematic diagram illustrating a view 310B for a sound dampened pet carrier 311 in accordance with an embodiment of the inventive arrangements disclosed herein. In 310B, a sound dampened pet abode can conform to traditional pet carrier designs (e.g., shape, appearance). In the embodiment, the pet carrier 311 can include one or more elements 312, 326. Elements 312, 326 can include, but are not limited to, rechargeable battery 312, air conditioner 326, and the like.

Rechargeable battery 312 can be used to power air conditioner 326. Battery 312 size and power can determine air conditioner 326 output. For instance, proprietary high power rechargeable batteries can be utilized to permit air conditioner 326 to operate for substantial durations.

Air conditioner 326 can be utilized to maintain the interior climate of pet carrier 311. Air conditioner 326 can include one or more ducts for uniformly conditioning pet carrier 311 interior. In one instance, air conditioner 326 can be located at the top of carrier 311 allowing maximum head dissipation to occur.

Drawings presented herein are for illustrative purposes only and should not be construed to limit the invention in any regard. In one embodiment, pet carrier 311 can include a power input plug for using power systems in buildings (e.g., power mains), vehicles (e.g., direct current), and the like. In another embodiment, pet carrier 311 can include wheels and a telescoping handle allowing the carrier to be rolled (e.g., similar to an attaché case).

The flowchart and block diagrams in the FIGS. 1-3B illustrate the architecture, functionality, and operation of possible implementations of systems according to various embodiments of the present invention. In this regard, each block in the block diagrams may represent a module or segment, which comprises one or more components and/or structures.

What is claimed is:

1. A portable pet abode with sound dampening characteristics comprising: an interior space of the pet abode having sufficient dimensions to allow a pet to comfortably reside within the interior space, wherein said interior space is a fully enclosed volume, wherein the interior space is formed from at least three walls, wherein at least one of the walls exhibits sound dampening characteristics, wherein the sound dampening characteristics mitigates a plurality of sounds transmitted to the interior space, wherein the plurality of sounds originates from a source external to the interior space, wherein the sound dampening properties reduce a sound pressure level of sounds heard within the interior space by at least half of the sound pressure level detected at an exterior point of the pet abode; wherein said interior space is climate controlled by a primary climate control; and wherein said portable pet abode comprises:
at least one climate sensor for detecting an environmental state of said interior space of the pet abode;
a fail-safe climate control system electronically or communicatively coupled to the at least one climate sensor, wherein the fail-safe climate control system automatically opens a door of the abode to permit the pet to pass through the door opening of the abode upon failure of the primary climate control as determined by the climate sensor.

2. The abode of claim 1, wherein the sound dampening characteristics of at least one wall is a result of the presence of a sound dampening material, wherein the sound dampening characteristics is unidirectional in that a magnitude by which sound is dampened from an external-to-internal environment is greater than a magnitude by which sound is dampened from an internal-to-external environment.

3. The abode of claim 1, wherein the sound dampening material is selectively removable, said abode further comprising:
a white noise generator for generating sound in the interior space of the pet abode to mask external sounds, which may be distressing to the pet.

4. The abode of claim 1, wherein the interior space is sealed from an external environment and is climate controlled by an air conditioning unit specifically integrated into the abode.

5. The abode of claim 1, further comprising:
a fail-safe system that automatically sends an alert via email or a short message service responsive to a failure of a client control system of the abode.

6. The abode of claim 1, further comprising:
a display for presenting video of the interior space of the abode captured via a camera, said display being on an exterior of the abode to provide a pet owner with visual real-time feedback to the sound dampened interior space.

7. The abode of claim 1, wherein an anchoring element permits a seatbelt to be placed through the anchoring element to secure the pet abode.

8. The abode of claim 1, further comprising:
an electric light emitting source for providing light to the interior space.

9. The abode of claim 1, wherein the sound dampened pet abode is portable enabling the abode to be utilized as a travel carrier for auto, train, and airline transport of a pet.

10. The abode of claim 1, wherein the sound dampened pet abode is a positionally fixed pet habitat occupying a relatively fixed area of an owner's dwelling, wherein the abode comprises at least five modular interface panels, which are functionally differentiated from one another, which interconnect to form a perimeter of the interior space.

11. The abode of claim 1, further comprising:
an audio/video subsystem having at least one of a plurality of audio/video inputs and outputs, said audio inputs comprising at least one input connector for an audio source to be played back on speakers of the interior space.

12. The abode of claim 1, wherein the pet abode is modularly constructed enabling multiple pet abodes to be connected together with a total interior space being shared, wherein when multiple pet abodes are connected sound damping integrity of the abodes is not compromised.

13. The abode of claim 1, wherein the pet abode comprises a heating unit that is part of a temperature control system for regulating temperature of the interior space.

14. A portable pet abode comprising:
a material established boundary forming a fully enclosed volume, said volume including an interior space for pets to reside, wherein said boundary is formed from sound dampening materials, wherein said sound dampening materials are thermal insulators;
a door embedded in the material established boundary, said door being a sealable door, which is able to be opened and closed, wherein pets are able to be inserted and removed from the pet abode via the door; and
an air cooling system having an exterior intake and outtake opening within the material established boundary, wherein the air cooling system comprises at least one fan, wherein the fan is used to selectively cool an interior of the pet abode, wherein a sound pressure level of sounds heard within the interior space of the pet abode are reduced by at least half of the sound pressure level detected at an exterior point of the pet abode; wherein said fully enclosed volume is climate controlled by a primary climate control; and
wherein said portable pet abode comprises:
at least one climate sensor for detecting an environmental state of said fully enclosed volume of the pet abode;
a fail-safe climate control system electronically or communicatively coupled to the at least one climate sensor, wherein the fail-safe climate control system automatically opens the door to permit the pet to pass through the door opening of the abode upon failure of the primary climate control as determined by the climate sensor.

15. The pet abode of claim 14, further comprising:
a temperature sensor for reading a temperature of the interior space of the pet abode; and
a user changeable temperature control permitting a user to select a maximum temperature for the interior space, wherein said temperature sensor is electronically coupled to the user changeable temperature control and to the at least one fan, wherein a speed of the fan is automatically increased responsive to the temperature sensor reading a temperature greater than the maximum temperature established by the user changeable temperature control.

16. The pet abode of claim 14, further comprising:
a battery for powering said at least one fan, wherein said pet abode is portable enabling the abode to be utilized as a travel carrier for auto, train, and airline transport of a pet, wherein the sound dampening characteristics of the pet abode is unidirectional in that a magnitude by which sound is dampened from an external-to-internal environment is greater than a magnitude by which sound is dampened from an internal-to-external environment.

17. A portable pet abode for housing a pet, said pet abode having sides formed from a sound dampening material such that a sound pressure level of sounds heard within the interior space of the pet abode are reduced by at least half of the sound pressure level detected at an exterior point of the pet abode, said pet abode comprising:
a material established boundary forming a fully enclosed volume, said volume including an interior space for pets to reside, wherein said boundary is formed from sound dampening materials, wherein said sound dampening materials are thermal insulators;
a door embedded in a side of the pet abode, said door being a sealable door, which is able to be opened and closed, wherein pets are able to be inserted and removed from the pet abode via the door;
a climate control system comprising at least one climate sensor, at least one user adjustable climate control, and at least one heating/cooling element, wherein the climate control system maintains the interior space of the pet abode within a temperature range established at least in part by the user adjustable climate control and sensed by the climate sensor;
a fail-safe climate control system electronically or communicatively coupled to the at least one climate sensor, wherein the fail-safe climate control system automatically opens the door to permit the pet to pass through the door opening of the abode upon failure of the climate control system as determined by the climate sensor; and
at least one window through which a pet included in the interior space is able to be viewed.

18. The pet abode of claim 17, wherein the pet abode is modularly constructed, wherein at least one side is able to be selectively removed to add and remove expansion modules coupled to the pet abode via an expansion module interface, wherein adding and removing of expansion modules changes an interior volume of the internal space of the pet abode.

19. The pet abode of claim 1, further comprising:
a material established boundary forming the fully enclosed volume, said volume including the interior space for pets to reside, wherein said boundary is formed from sound dampening materials, wherein said sound dampening materials are thermal insulators.

* * * * *